United States Patent [19]

Ono et al.

[11] 4,095,553
[45] Jun. 20, 1978

[54] SPEEDOMETER WITH AN EXCEEDING SPEED WARNING DEVICE

[76] Inventors: Katsutoshi Ono, No. 3-6-1, Gyotoku-ekimae, Ichikawa City; Yasumasa Takagi, No. 766-9, Nishi-Motojuku, Higashi-Matsuyama City, both of Japan

[21] Appl. No.: 734,751

[22] Filed: Oct. 22, 1976

[30] Foreign Application Priority Data

Oct. 27, 1975 Japan .................................. 50-128347

[51] Int. Cl.² ............................................... G01P 1/10
[52] U.S. Cl. ..................................... 116/116; 73/518; 180/106
[58] Field of Search ........................... 116/57, 74, 116; 180/110, 106; 73/496, 518, 578

[56] References Cited

U.S. PATENT DOCUMENTS

| | | | |
|---|---|---|---|
| 1,318,638 | 10/1919 | Anthon et al. | 116/74 |
| 2,359,191 | 9/1944 | Bayston | 116/57 |
| 2,798,174 | 7/1957 | Helgeby | 116/57 |
| 3,125,983 | 3/1964 | Valus | 116/74 |
| 3,580,085 | 5/1971 | Hitzelberger | 73/496 |

*Primary Examiner*—Daniel M. Yasich

[57] ABSTRACT

A lever fixed to a metal cap or speed cup of a speedometer is vibratably engageable with projections provided on a rotating ring member when a speed pointer rotatable with the metal cap deflects beyond a predetermined maximum index, so that the speed pointer is vibrated to give a warning to the vehicle driver.

11 Claims, 7 Drawing Figures

SPEEDOMETER WITH AN EXCEEDING SPEED WARNING DEVICE

The present invention relates to a speedometer used on an automotive vehicle for indicating the speed of the vehicle.

It has been widely observed that, in order to achieve economical fuel consumption and safe driving, the vehicle driver runs the vehicle at a speed considerably lower than its desired cruising speed. Thus, it has been proposed that the dial of the speedometer is so graduated to have a relatively low maximum index.

However, there will inevitably arise, when the vehicle is subjected to a downhill cruising to cause an increase in its speed, the speed pointer of the speedometer exceedingly deflects beyond the regraduated maximum index. Furthermore, the above-mentioned re-graduation to the dial of the speedometer does not have a direct effect of making the vehicle driver operate the vehicle at a relatively low speed.

Hitherto, there has been thus proposed a warning system which gives some warnings to the vehicle driver when the pointer of the speedometer deflects over beyond the maximum index. However, in this system, preferable results have not been obtained as will be well described below.

Therefore, the present invention is proposed to eliminate the drawbacks and dermerits encountered in the conventional speedometer with the speeding warning device.

It is an object of the present invention to provide an improved speedometer which can not only indicate the speed of the motor vehicle equipped therewith but also give a warning to the vehicle driver when the vehicle runs at a speed higher than a predetermined level.

It is another object of the present invention to provide an improved speedometer having a speed pointer which can vibrate in a given angular range when the speed pointer deflects beyond a predetermined point due to the exceedingly high speed cruising of the vehicle.

It is still another object of the present invention to provide an improved speedometer with a speeding warning device, which is manufactured in a relatively inexpensive manner.

It is a further object of the present invention to provide a speedometer for measuring rotational speed, comprising a permanent magnet fixed for rotation with a shaft the speed of which is to be measured, a metal cap disposed adjacent to but spaced from the permanent magnet and attached to a spindle carrying a speed pointer, the spindle being rotatable against the bias of a spring, a ring member provided at its outer surface with a plurality of projections, the ring member being positioned adjacent to the metal cap and rotatably driven by the shaft, and means consecutively contactable with the projections for causing the metal cap to vibrate at a given degree of angular rotation when the pointer deflects beyond a predetermined point.

Other objects and advantages of the present invention will become more apparent from the following description when taken in conjunction with the accompanied drawings, in which.

Prior to describing the construction of the improved speedometer of the present invention, a description of the conventional speedometers will be given in order to clarity the inventive steps of the present invention.

Figure 1:
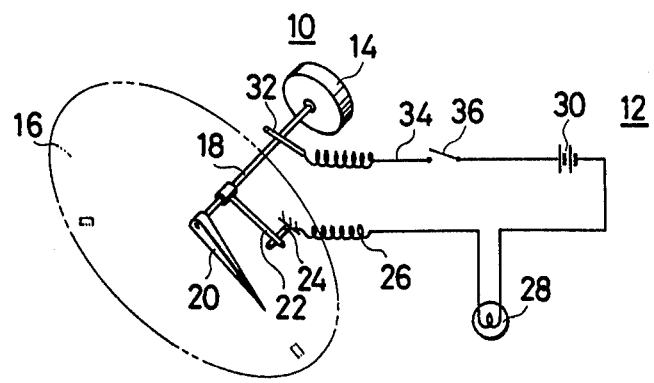
FIG. 1 is a schematically illustrated view of a conventional speedometer with a warning device.

In FIG. 1, one of the conventional speedometers is shown with a warning system 12. The speedometer 10 has a metal cap or speed cup 14 which is arranged close to but spaced at a predetermined distance from a permanent magnet (not shown) directly driven by a shaft (not shown) whose revolution speed is to be measured. Extending from the metal cap 14 toward a calibrated scale 16 is a spindle 18 which has at its leading end a speed pointer 20. Connected at its end to the spindle 18 adjacent the pointer 20 is an arm 22 which is thus rotatable with the spindle 18. An arm stopper 24 is fixed on the calibrated scale 16 in a position where the arm 22 is engageable with the arm stopper 24 when the pointer 20 defects beyond the maximum index carried on the scale 16. The arm stopper 24 is electrically connected through a lead wire 26 and a warning lamp 28 to a cathode of a battery 30. Slidably contacting with the spindle 18 is a brush member 32 which is electrically connected to an anode of the battery 30 through a lead wire 34 and a switch 36.

With this construction, when the switch 36 is closed and the pointer 20 deflects beyond the maximum index, due to the exceedingly high speed cruising of the vehicle, to allow the arm 22 to be brought into engagement with the arm stopper 24, the electric connection between the brush member 32 and the arm stopper 24 is achieved to light the warning lamp 28 for giving a warning to the vehicle driver.

However, in this construction of the conventional speedometer, there will arise the following several drawbacks, which are:

(1) There is a possibility that the electric connection is broken due to the obstruction of dust and contaminant which are insulatingly disposed between two members, such as the spindle 18 and the brush member 32, contactable to each other, and the arm 22 and the arm stopper 24 contactable to each other.

(2) When the arm 22 is rapidly rotated toward the maximum index in response to the rapid acceleration of the vehicle, there may happen that the arm 22 violently strikes against the arm stopper 24 to cause damages of these members 22 and 24.

(3) The lighting of the warning lamp 28 in the speedometer 10 may cause some misconceptions of the vehicle driver.

Figure 2:
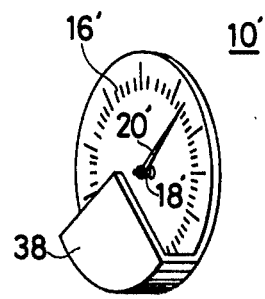
FIG. 2 is a sketch of another conventional speedometer with a so-called warning device.

Referring to FIG. 2 of the drawings, another conventional speedometer 10' is shown. This speedometer 10' eliminates the above-mentioned drawbacks to some extent.

The speedometer 10' includes a calibrated scale 16' with a central opening (no numeral) into which a leading end of a spindle 18' is projected. A pointer 20' is connected to the leading end of the spindle 18', as shown. Although not shown in the drawing, the mechanism for rotating the spindle 18' is generally the same as in the case of FIG. 1. A shade 38 is mounted on the calibrated scale 16' in a position where, if the pointer 20° deflects beyond the maximum index, the pointer 20' goes behind the shade 38 disappears from sight.

However, also in the case, the following disadvantages will occur inevitably, which are:
(1) Disappearance of the pointer 20' from the scale 16' will cause the vehicle driver to be in suspense as to the vehicle speed.
(2) The provision of the shade 38 will impose limitations on the styling of the speedometer 10'.

Therefore, the present invention is proposed to eliminate such several drawbacks encountered in the conventional speedometers mentioned above.

Figure 3:
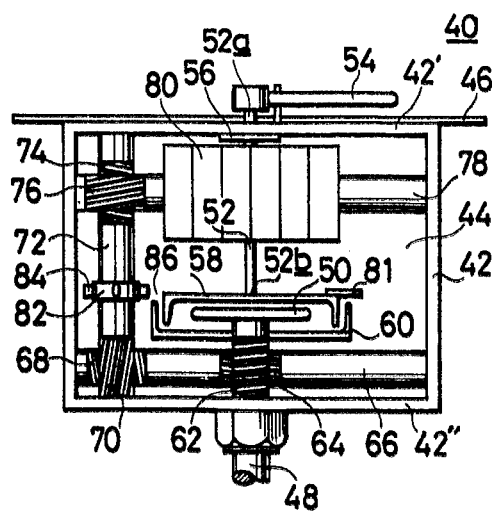
FIG. 3 is a plan view of an improved speedometer with a warning device embodying the present invention.

Referring to FIG. 3 of the drawings, there is illustrated an improved speedometer 40 with a warning device (no numeral) showing a first embodiment of the present invention.

The speedometer 40 includes a frame 42 forming a container space 44 in it. A dial or calibrated scale 46 is attached to a front portion 42' of the frame 42. A shaft 48 whose revolution speed is to be measured is mounted in a rear portion 42'' of the frame 42, which is spaced from the front portion 42', for free rotation relative thereto. Although not shown, the shaft 48 is driven by a flexible wire connected with gearing within a transmission, or occasionally from a front wheel. The shaft 48 has one axial end extending into the space 44. The axial end is fixed with a permanent magnet 50 so that the magnet 50 is rotated with the shaft 48 in a plane normal to the axis of the shaft 48. A spindle 52 extends through the front portion 42' of the frame 42 and the dial 46 and has one axial end 52a extending above the dial 46 and carrying a speed pointer 54. A spiral spring 56 is attached at one end to the spindle 52 and at the other end to a portion of the front portion 42' of the frame 42 to bias the pointer 54 toward the zero index (not shown) on the dial 46. A metal cap or speed cup 58 is fixedly attached by conventional means e.g. by threadably mating the components to the other axial end 52b of the spindle 52 while being spaced away from the permanent magnet 50. The metal cap 58 is located in an induction field cup 60 attached to the shaft 48 to be rotated thereby. The shaft 48 is formed with a worm 62 engageable with a worm gear 64 formed on a generally middle portion of a first transmission shaft 66 which is rotatably supported by the frame 42 in a conventional manner. The first transmission shaft 66 is located under the shaft 48 and arranged perpendicularly to the axis of the shaft 48, and is formed at its one end portion with a worm 68 which is engageable with a worm gear 70 formed on an end portion of a second transmission shaft 72. The second transmission shaft 72 is rotatably supported by the frame 42 in a conventional manner and arranged above the first transmission shaft 66 while being perpendicular to the axis of the first transmission shaft 66. The second transmission shaft 72 is formed at its other end portion with a worm 74 which is engageable with a worm gear 76 formed on an end portion of a third transmission shaft 78 which is rotatably supported by the frame 42. The third transmission shaft 78 is arranged perpendicularly to the axis of the second transmission shaft 72 and thus parallelly to the axis of the first transmission shaft 66. Operatively connected to the third transmission shaft 78 is a conventional odometer 80.

With this construction, the speedometer 40 can indicate the speed of the vehicle equipped therewith and also record the distance traveled.

According to the present invention, additional mechanical coactions are necessary.

First, the metal cap 58 and the second transmission shaft 72 must be so arranged that they rotate in a same direction when the speed pointer 54 moves toward the maximum index in response to the increasing vehicle speed.

Second, a lever 81 is fixed to the peripheral portion of the metal cap 58 so as to project radially outwardly from the metal cap 58 as shown. It should be noted that the provision of the lever 81 to the metal cap 58 is made so as not to disturb the balance of the metal cap 58. A ring member 82 having at its outer surface a plurality of radially extending projections 84 is firmly coupled onto the second transmission shaft 72 at a position near the periphery of the metal cap 58. More specifically, the ring member 82 is located in a position in which, when the lever 81 moves on toward the ring member 82 due to the exceeding deflection of the pointer 54 from the maximum index, the leading end portion of the lever 81 is brought into engagement with one of the projections 84 which is, then, facing with the lever 81 at a predetermined angle. For preventing the lever 81 from passing through a gap 86 defined between the ring member 82 and the metal cap 58, the outer diameter of the ring member 82 is so designed that the outer periphery of the ring member 82 is assuredly engageable with the leading end of the lever 81 even when one of the projections fails to stop the exceeding deflection of thelever 81.

With this construction, when the speed pointer 54 deflects beyond the predetermined maximum index due to the exceedingly high speed cruising of the vehicle, the leading end of the lever 81 on the metal cap 58 is brought into engagement with the projections 84 of the ring member 82 to be pushed back by them 84, intermittently. Thus, in this state, the speed pointer 54 is subjected to vibration to give a visual warning to the vehicle driver.

Figure 4:
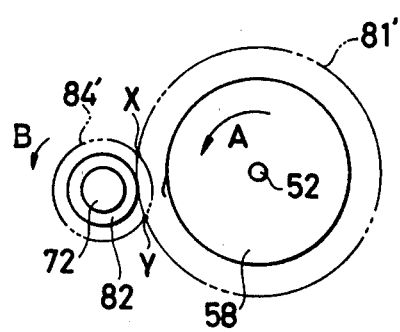
FIGS. 4 to 6 are schematic illustrations for explaining the principle of the present invention.

For the purpose of more clearly explaining the relative position of the lever 81 on the metal cap 58 and the ring member 82 on the second transmission shaft 72, FIG. 4 is prepared, which shows two circular paths 81' and 84' respectively swept by the leading end of the lever 81 and the leading end of the projection 84. The metal cap 58 with the lever 81 and the ring member 82 with the projections 84 are rotated counterclockwise, as indicated by the arrows A and B, as the vehicle speed increases. The references X and Y are intersection points of the lever 81 and the projections 84.

Now, a few considerations on selection of number of the projections 84 will be given with respect to this case.

Assuming that the maximum index of the dial 46 is 120 km/h [at this speed, the rotational speed of the shaft 48 is determined to be 1274 rpm (Japanese Industrial Standard)], the reduction ratios between the shaft 48 and the first transmission shaft 66 and between the first transmission shaft 66 and the second transmission shaft 72 are 1/11 and 2/11, respectively. Thus, the rotational speed of the second transmission shaft 72 and accordingly of the ring member 82 is calculated by the following procedure.

$$1274 \times 1/11 \times 2/11 \times 1/60 = \frac{1}{3} \text{ (rps)} \tag{1}$$

Thus, when three projections are arranged around the ring member 82 with equal separations, the contact of the lever 81 with anyone of the projections 84 occurs one time per 1 second. This means that the pointer 54 rotatable with the lever 81 vibrates more than 60 times per one minute when the vehicle runs faster than the predetermined speed (120 km/h), thereby causing the vehicle driver to notice the exceedingly high speed cruising.

Figure 5:
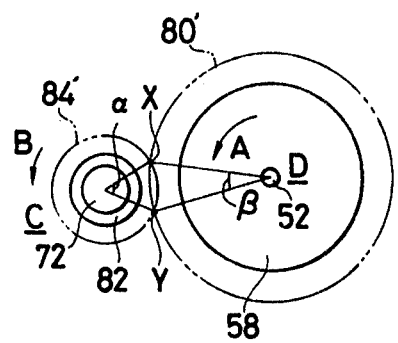

FIG. 5 shows a case in which the ring member 82 and the metal cap 58 are more spacedly arranged so as not to provide a contact between the leading end of the lever 81 and the periphery of the ring member 82. In this case, the following procedure is required, that is, the neighbouring two projections on the ring member 82 must be arranged in such a way that an angle made by two lines respectively passing through a center C of the ring member 82 and one of the two projections, the other of the projections is considerably smaller than an angle $\alpha$ made by other two lines respectively passing through the center C of the ring member 82 and the point-X, the point-Y. With this procedure, the before-mentioned trouble of the lever 81 is eliminated.

Figure 6:
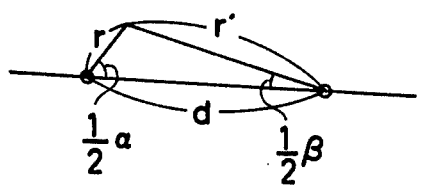

FIG. 6 is an illustration for explaining a case in which the distance between the center C (see FIG. 5) of the metal cap 58 and the leading end of the lever 81 is $r'$, the distance between the center C of the ring member 82 and the leading end of one of the projections 84 is $r$, and the distance between the center D of the metal cap 58 and the center C of the ring member 82 is $d$.

In this case, the following relations will be induced, which are:

$$r \cdot \sin \tfrac{1}{2} \alpha = r' \cdot \sin \tfrac{1}{2} \beta \qquad (20)$$

$$r \cdot \cos \tfrac{1}{2} \alpha + r' \cdot \cos \tfrac{1}{2} \beta = d \qquad (3)$$

where:
$\alpha$ an angle made by two lines respectively passing through a center C of the ring member 82 and the point-X, the point-Y;
$\beta$ an angle made by two lines respectively passing through the center D of the metal cap 58 and the point-X, the point-Y.

From these equations (2) and (3), the following is given, in which:

$$\cos \tfrac{1}{2} \alpha = \tfrac{1}{2dr} \cdot (r^2 + d^2 - r'^2) \qquad (4)$$

From the equation (4), it will be appreciated that, when a relation of $5r = r'$ is substituted into the equation (4), the angle $\alpha$ is above 90°. This means that, if more than four projections are mounted on the periphery of the ring member 82 with substantially equal separations, the leading end of the lever 81 is pushed back intermittently by the projections 84 without fail in a case wherein the vehicle runs faster than the predetermined speed. Thus, in this instance, the speed pointer 54 vibrates continuously in the region of the maximum index.

Although, in the previous description, the lever 81 is shown to be fixed to the metal cap 58, it is also possible to arrange such lever onto the spindle 52 so long as the leading end of the subject lever is engageable with the projections 84 in a same manner as described hereinbefore.

Figure 7:
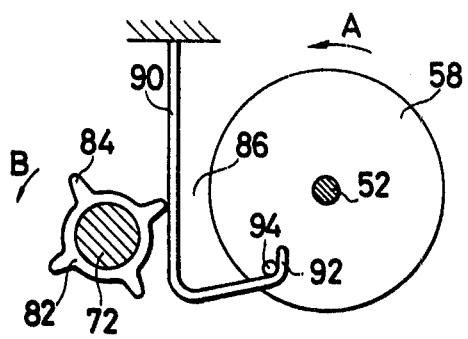
FIG. 7 is a sketch of a modification of the warning device usable in the speedometer of FIG. 3 showing a second embodiment the present invention.

Referring to FIG. 7 of the drawings, there is shown a modification of a warning device useable in the speedometer 40 of FIG. 3. In this drawing, the numerals which are same as in the case of FIG. 3 indicate the same parts as of the case of FIG. 3. In this modification, a J-shaped spring member 90 is arranged between the space 86 defined by the metal cap 58 and the ring member 82 with the projections 84 in such a manner that an upper end of the member 90 is fixed to some stationary member such as the frame 42, and the generally middle portion of the member 90 is contactable with the projections 84 when the ring member 82 is subjected to rotation. Thus, the spring member 90 is vibrated while the rotation of the ring member 82 is continued. As shown, the other end portion of the spring member 90 has a bent end 92 which extends toward the metal cap 58. On the surface of the metal cap 58 is fixed a stub member 94 which is engageable with the bent end 92 of spring member 90 when the metal cap 58 rotates for a certain angle in the direction indicated by the arrow A. More particularly, the stub member 94 is so arranged to engage with the bent end 92 to stop the exceeding deflection of the pointer 54 when the vehicle runs faster than the speed corresponding to the maximum index carried on the dial 46. Therefore, in the abnormally high speed cruising of the vehicle, the metal cap 58 and the pointer 54 are subjected to vibration due to the continuous vibration of the spring member 90 to give a warning to the vehicle driver.

With the above-stated construction of the speedometer with the warning device according to the present invention, the following merits and advantages will arise.

(1) Since the speed pointer 54 to which the driver frequently gives attention is subjected to vibration in the case of the exceedingly high speed cruising, the warning transmission to the driver is assuredly made.

(2) Since the warning device of the invention has no electrical parts and is simple in construction, the reliability of the warning device is increased and it is produced in a relatively inexpensive manner.

(3) Since the parts constituting the warning device are few in number and relatively small in size, the container space in the speedometer is not so largely limited.

Although in the previous description, it has been described that the subject warning device is employed in a motor road vehicle speedometer, the device is applicable to other speedometers.

What is claimed is:

1. A speedometer for measuring rotational speed and for providing a visible warning by pointer vibration when excessive speed is reached comprising:
a housing;
a shaft, the speed of which is to be measured, extending through the bottom face of said housing and having a permanent magnet fixed for rotation therewith located within the housing;
a spindle located essentially spacedly coaxially to said shaft extending through the top face of the housing, said spindle being rotatable against the bias of a spring in response to rotation of said shaft;
a metal speed cap fixedly attached to said spindle located within the housing and adjacent to said magnet and magnetically connected therewith to produce said spindle rotation;
a ring member parallelly mounted adjacent to said metal cap provided with a plurality of projections and rotatably driven by said shaft;
means on said speed cap consecutively contactable with said projections for causing said metal cap to vibrate at a given degree of angular rotation mounted on said cap; and a speed pointer attached to said spindle at the portion extending above the upper face of the housing said vibrations correlated to the location of the speed pointer in response to rotation odf the spindle beyond the predetermined point.

2. A speedometer as claimed in claim 1, in which said means is a lever which is fixed to said metal cap to project radially outwardly from said metal cap, the leading end of said lever being contactable consecutively with said projections upon rotation of said ring member.

3. A speedometer as claimed in claim 1, in which said means includes a stub member fixed to said metal cap, and a spring member having an end portion fixed to a stationary member of the speedometer, a generally middle portion consecutively contactable with said projections upon rotation of said ring member, and a bent end portion engageable with said stub member to stop the exceeding rotation of said metal cap when said pointer deflects beyond said predetermined point.

4. A speedometer for a motor vehicle, comprising a housing, a permanent magnet fixed for rotation with a first shaft the speed of which is to be measured, said first shaft being mounted in said housing, a metal speed cap disposed in said frame adjacent but spaced from said permanent magnet and attached to a spindle carrying a speed pointer, said speed pointer located exterior to said housing, said spindle being rotatable against the bias of a spring as a result of first shaft rotation due to magnetic connection therewith, an odometer operatively connected to said shaft through a series of shafts including a second shaft which is arranged substantially parallel with said spindle, a ring member provided at the outer surface of said second shaft with a plurality of projections and firmly disposed onto said second shaft at a position near the periphery of said metal cap, and means on said cap consecutively engageable with said projections for causing said metal cap to vibrate at a given degree of angular rotation when said pointer deflects beyond a predetermined point.

5. A speedometer as claimed in claim 4, further comprising an induction field cup attached to said first shaft in such a manner that said permanent magnet is located between said induction field cup and said metal cup.

6. A speedometer as claimed in claim 5, in which said plurality of projections of said ring member are equally spaced apart from each other.

7. A speedometer as claimed in claim 6, in which said means comprises a stub member fixed to said metal cap, and a spring member having an end portion fixed to said frame, a generally middle portion consecutively contactable with said projections upon rotation of said ring member and a bent end portion enageaable with said stub member to stop the exceeding rotation of said metal cap when said pointer deflects beyond said predetermined point.

8. A speedometer as claimed in claim 6, in which said means comprises a lever fixed to the periphery of said metal to project radially outwardly from said metal cap, the leading end of said lever being contactable with said projections when said metal cap is rotated at a predetermined angle due to the exceeding deflection of said speed pointer.

9. A speedometer as claimed in claim 8, in which the leading end of said lever is engageable with the outer periphery of said ring member other than said projections when the projections fail to stop the exceeding deflection of said lever.

10. A speedometer as claimed in claim 8, in which the neighboring two projections on said ring member are arranged in such a manner that an angle made by two lines respectively passing through a center of said ring member and one of the two projections, the other of the projections is considerably smaller than an angle made by said other two lines respectively passing through said center of said ring member and a point-X, a point-Y, said point-X and point-Y being intersection swept by said leading end of said lever and the leading ends of said projections.

11. A speedometer as claimed in claim 10, in which the rotational direction of said ring member is the same as that of said metal cap when the rotational speed of said first shaft is accelerated.

* * * * *